(12) United States Patent
Kim et al.

(10) Patent No.: US 7,982,825 B2
(45) Date of Patent: Jul. 19, 2011

(54) BACKLIGHT ASSEMBLY AND LIQUID CRYSTAL DISPLAY APPARATUS HAVING THE SAME

(75) Inventors: Jae-Kwang Kim, Yongin-si (KR); Hwan-Jin Kim, Seongnam-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 966 days.

(21) Appl. No.: 11/626,437

(22) Filed: Jan. 24, 2007

(65) Prior Publication Data

US 2010/0033653 A1 Feb. 11, 2010

(30) Foreign Application Priority Data

Jan. 25, 2006 (KR) .................... 10-2006-0007598

(51) Int. Cl.
*G02F 1/13357* (2006.01)
*G09F 13/04* (2006.01)

(52) U.S. Cl. ....................... 349/65; 362/97.1

(58) Field of Classification Search ............. 349/65
See application file for complete search history.

(56) References Cited

U.S. PATENT DOCUMENTS

| | | | | |
|---|---|---|---|---|
| 5,876,107 A * | 3/1999 | Parker et al. | ............... | 362/600 |
| 5,947,578 A * | 9/1999 | Ayres | ............... | 362/629 |
| 6,530,670 B2 * | 3/2003 | Hirayama | ............... | 362/628 |
| 7,470,034 B2 * | 12/2008 | Pang | ............... | 362/29 |
| 7,515,220 B2 * | 4/2009 | Ko et al. | ............... | 349/58 |
| 7,616,849 B1 * | 11/2009 | Simon | ............... | 385/31 |
| 7,695,178 B2 * | 4/2010 | Suh et al. | ............... | 362/612 |
| 2002/0175632 A1 * | 11/2002 | Takeguchi | ............... | 315/169.1 |
| 2004/0207775 A1 * | 10/2004 | Min et al. | ............... | 349/65 |
| 2005/0001952 A1 * | 1/2005 | Han et al. | ............... | 349/65 |

FOREIGN PATENT DOCUMENTS

| | | |
|---|---|---|
| CN | 1577005 | 2/2005 |
| CN | 1591914 | 3/2005 |
| JP | 2004-138965 | 5/2004 |

\* cited by examiner

*Primary Examiner* — Michelle R Connelly Cushwa
(74) *Attorney, Agent, or Firm* — F. Chau & Associates, LLC

(57) ABSTRACT

A backlight assembly includes a light-guiding plate and a light-generating member. The light-guiding plate has a lower surface, an upper surface and a side surface at which a combining recess is formed. The light-generating member includes a light source and a body. The combining recess has a first side surface, a second side surface facing the first side surface and a light-entering surface connected to the first and second side surfaces. A first width of the combining recess adjacent to the side surface of the light-guiding plate is smaller than a second width of the combining recess adjacent to the light-entering surface. Moreover, at least a portion of the body of the light-generating member is for being inserted into the combining recess.

33 Claims, 11 Drawing Sheets

BACKLIGHT ASSEMBLY AND LIQUID CRYSTAL DISPLAY APPARATUS HAVING THE SAME

CROSS-REFERENCE TO RELATED APPLICATIONS

This application relies for priority upon Korean Patent Application No. 2006-7598 filed on Jan. 25, 2006, the disclosure of which is hereby incorporated by reference herein in its entirety.

BACKGROUND OF THE INVENTION

1. Technical Field

The present disclosure relates to a backlight assembly and a liquid crystal display apparatus having the backlight assembly. More particularly, the present disclosure relates to a backlight assembly capable of improving brightness and a liquid crystal display apparatus having the backlight assembly.

2. Description of the Related Art

A liquid crystal display (LCD) apparatus may include an LCD panel and a backlight assembly. The LCD panel may display and image using light provided from the backlight assembly.

The backlight assembly may include a light source generating the light. Examples of these light sources include a cold cathode fluorescent lamp CCFL), and a light emitting diode (LED).

An LED is a point light source having a light-emitting surface smaller than the light-emitting surface of a CCFL. For instance, light exiting from the LED enters a side surface of a light-guiding plate. The light-guiding plate changes the light to provide the LCD panel with light having the shape of the surface of the light source.

In addition, with a conventional backlight assembly, a plurality of LEDs may be disposed adjacent to the side surface of the light-guiding plate and adjacent to each other. The LEDs are typically secured as part of the backlight assembly using adhesive tape. However, with the above-mentioned conventional backlight assembly, the distance between the LEDs and the light-guiding plate may differ from each other. As a result, a deviation in brightness may occur, thereby possibly leading to the display quality of the liquid crystal display being deteriorated.

SUMMARY OF THE INVENTION

In accordance with an exemplary embodiment of the present invention, a backlight assembly is provided. The backlight assembly includes a light-guiding plate and a light-generating member. The light-guiding plate has a lower surface, an upper surface and a side surface at which a combining recess is formed. The light-generating member includes a light source and a body. The combining recess has a first side surface, a second side surface facing the first side surface and a light-entering surface connected to the first and second side surfaces. A first width of the combining recess adjacent to the side surface of the light-guiding plate is smaller than a second width of the combining recess adjacent to the light-entering surface. Moreover, at least a portion of the body of the light-generating member is for being inserted into the combining recess.

The combining recess may have various shapes. For example, the combining recess may have a polygonal shape when viewed from a plan view. Furthermore, the combining recess may have a curved surface having a predetermined curvature. The second width of the combining recess may increase as the distance from each of the first and second side surfaces to the light-entering surface decreases. A whole portion or a portion of the body may be inserted into the combining recess.

For example, each of the first and second side surfaces of the combining recess may have substantially the same shape as a side surface of the body inserted into the combining recess. A width of the body adjacent to the light-entering surface is greater than the first width of the combining recess.

The combining recess may be opened upward. When the combining recess has the curved surface having a predetermined curvature, the curvature may increase or decrease according to a distance between the curved surface and the light-entering surface. The light-guiding plate may further have a supporting portion disposed under the combining recess to support the light-generating member. The supporting portion may have an opening.

In accordance with an exemplary embodiment of the present invention, a backlight assembly is provided. The backlight assembly includes a light-guiding plate and a light-generating member. The light-guiding plate has a lower surface, an upper surface at which a combining recess is formed. The light-generating member includes a light source and a body. The combining recess has a side surface facing and a light-entering surface. In addition, at least a portion of the body of the light-generating member is for being inserted into the combining recess. The light-guiding plate may further have a supporting portion disposed under the combining recess to support the light-generating member. A predetermined pattern may be formed at the light-entering surface to diffuse light and/or to condense light.

In accordance with an exemplary embodiment of the present invention a liquid crystal display apparatus is provided. The liquid crystal display apparatus includes a backlight assembly, an optical sheet and a liquid crystal display panel. The backlight assembly includes a light-guiding plate and a light-generating member. The light-guiding plate has a lower surface, an upper surface and a side surface at which a combining recess is formed. The light-generating member includes a light source and a body. The combining recess has a first side surface, a second side surface facing the first side surface and a light-entering surface connected to the first and second side surfaces. A first width of the combining recess adjacent to the side surface of the light-guiding plate is smaller than a second width of the combining recess adjacent to the light-entering surface. Also, at least a portion of the body of the light-generating member is inserted into the combining recess. Moreover, the optical sheet is disposed on the backlight assembly. The liquid crystal display panel displays an image using the light. The light source may be a light emitting diode. The liquid crystal display apparatus may further include a flexible printed circuit board to cover the light-generating member.

According to the above exemplary embodiments, the distance between the light-generating member and the light-guiding plate is uniformly maintained. Thus, light generated by the light-generating member may uniformly enter the light-guiding plate. Therefore, a variation in brightness may be reduced.

BRIEF DESCRIPTION OF THE DRAWINGS

Exemplary embodiments of the present invention can be understood in more detail from the following detailed description taken in conjunction with the accompanying drawings wherein.

DESCRIPTION OF THE EXEMPLARY EMBODIMENTS

Figure 1:
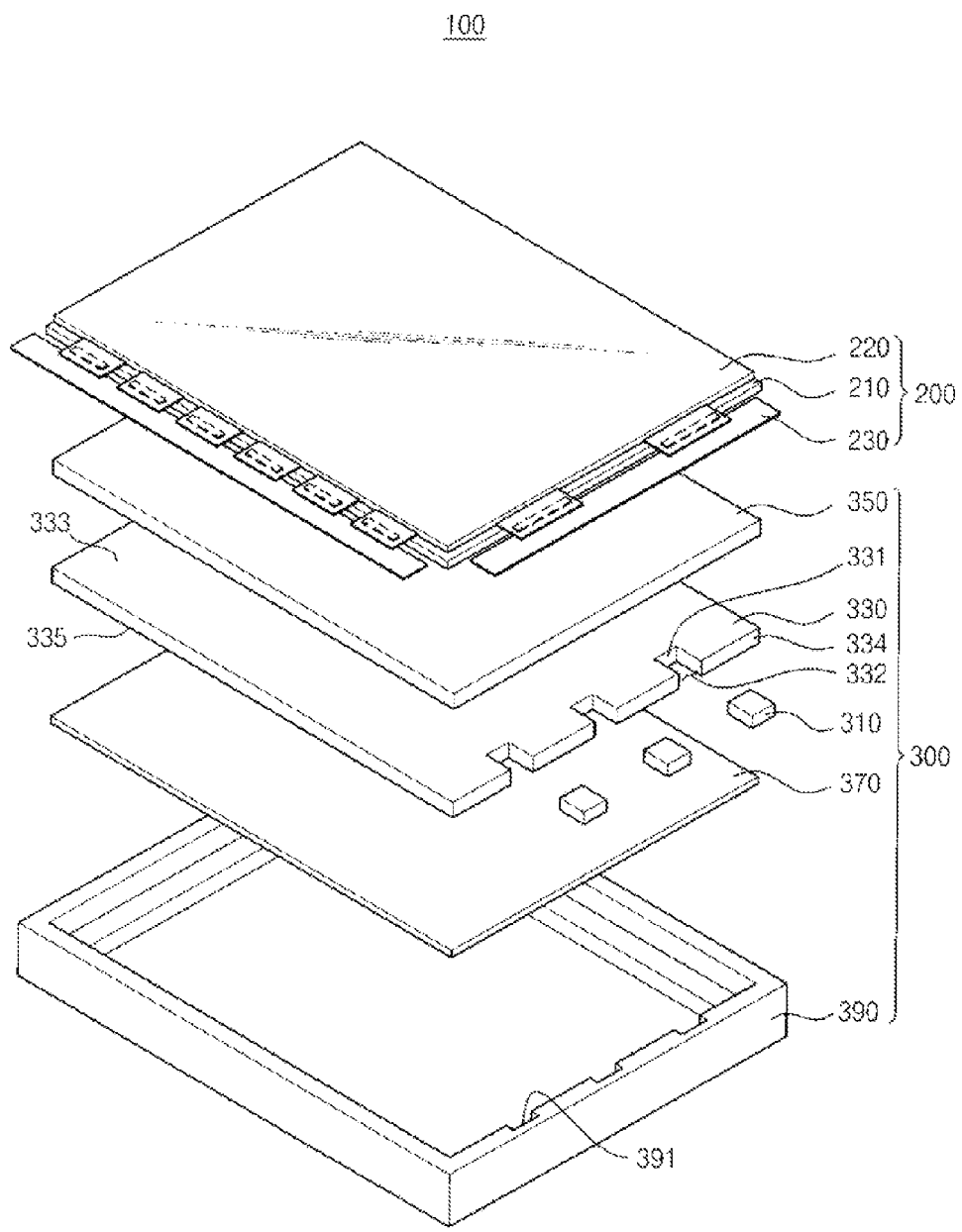
FIG. 1 is an exploded perspective view illustrating a liquid crystal display apparatus according to an exemplary embodiment of the present invention.

The invention is described more fully hereinafter with reference to the accompanying drawings, in which exemplary embodiments of the invention are shown. The invention may, however, be embodied in many different forms and should not be construed as limited to the exemplary embodiments set forth herein.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath," "below," "lower," "above,""upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in the specification, specify the presence of stated features, integers, steps, operations, elements, and/or components, but do not preclude the presence or addition of one or more other features, integers, steps, operations, elements, components, and/or groups thereof.

Exemplary embodiments of the invention are described herein with reference to cross-section illustrations that are schematic illustrations or idealized embodiments (and intermediate structures) of the invention. As such, variations from the shapes of the illustrations as a result, for example, of manufacturing techniques and/or tolerances, are to be expected. Thus, the exemplary embodiments of the invention should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the invention.

FIG. 1 is an exploded perspective view illustrating a liquid crystal display apparatus according to an exemplary embodiment of the present invention.

Referring to FIG. 1, a liquid crystal display (LCD) apparatus 100 includes a LCD panel 200 displaying an image and a backlight assembly 300 providing the LCD panel 200 with light.

The LCD panel 200 includes a thin-film transistor (TFT) substrate 210 having a plurality of TFTs and a color filter substrate 220 that faces the TFT substrate 210. The color filter substrate 220 is combined with the TFT substrate 210 and a liquid crystal layer interposed between the TFT substrate 210 and the color filter substrate 220.

A driving printed circuit board (PCB) 230 is disposed in a peripheral area of the LCD panel 200 to operate the LCD panel 200. The driving PCB 230 applies a gate-driving signal and a data-driving signal to the LCD panel 200 to control the light-transmittance of the liquid crystal layer.

The backlight assembly 300 includes a light-generating member 310 to generate light, a light-guiding plate 330 to guide the light generated by the light-generating member 310 to the LCD panel 200, a first optical sheet 350 disposed between the light-guiding plate 330 and the LCD panel 200 to improve the optical characteristics of the light, a second optical sheet 370 disposed under the light-guiding plate 330 to reflect light leaking from the light-guiding plate 330 toward the LCD panel 200 and a mold frame 390 to receive the light-generating member 310, the light-guiding plate 330, the first and second optical sheets 350 and 370. The mold frame 390 has a recess 391 to receive a portion of the light-generating member 310.

Examples of a light source of the light-generating member 310 include a light emitting diode (LED). A plurality of the light-generating members 310 may be disposed adjacent to a side surface of the light-guiding plate 330.

The light-guiding plate 330 may have a rectangular shape with a predetermined thickness. For example, the light-guiding plate 330 includes polymethylmethacrylate (PMMA) with beneficial properties such as mechanical strength, chemical resistance and transmittance with respect to a visible ray.

The light-guiding plate 330 may have a wedge shape so that a first side portion of the light-guiding plate 330, which faces the light-generating member 310, is thicker than a second side of the light-guiding plate 330, which is in opposite to the first side.

The light-guiding plate 330 has a light-entering surface 331, a light-exiting surface 333, a side surface 334 and a light-reflective surface 335. Light generated by the light-generating member 310 enters the light-guiding plate 330 through the light-entering surface 331. The light exits from the light-guiding plate 330 toward the LCD panel 200 through the light-exiting surface 333. A combining recess 332 is formed at the side surface 334. The light-reflective surface 335 reflects the light toward the light-exiting surface 333. The light-reflective surface 335 faces the light-exiting surface 333. The combining recess 332 may have various shapes. For example, the combining recess 332 may have a polygonal shape when viewed from a plan view. Furthermore, the combining recess 332 may have a curved surface having a predetermined curvature. When the combining recess 332 has a curved surface having a predetermined curvature, the curvature may increase or decrease depending upon, for example, the distance between the curved surface and the light-entering surface 333.

A reflective pattern is formed at the light-reflective surface 335 to reflect the light toward the light-exiting surface 333. For example, light-reflective ink may be printed on the light-reflective surface 335 to form the reflective pattern. The reflective pattern may have a geometric shape capable of reflecting light, refracting light and/or scattering light.

Figure 2A:
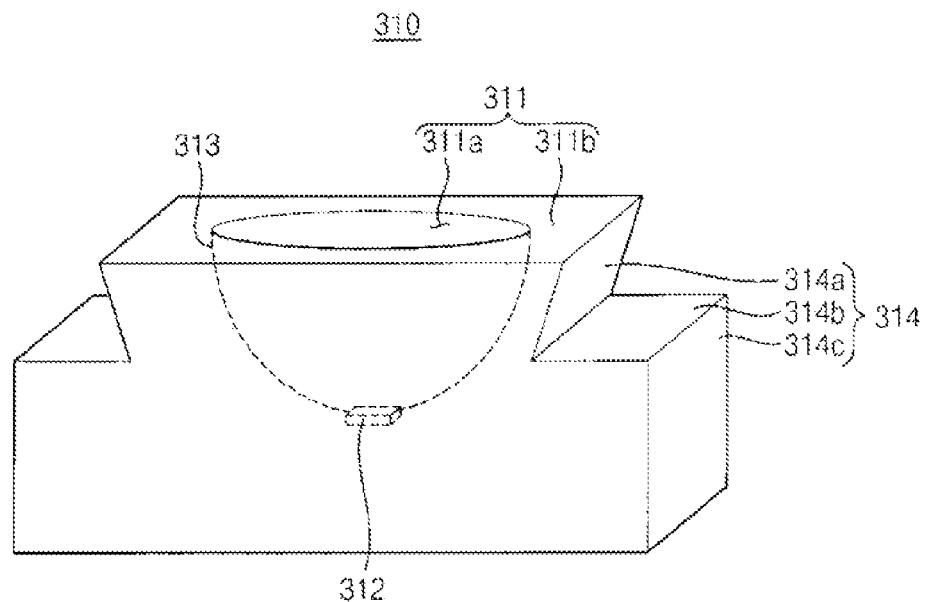
FIGS. 2A and 2B are perspective views illustrating a light-generating member of a backlight assembly according to an exemplary embodiment of the present invention.
Figure 2B:
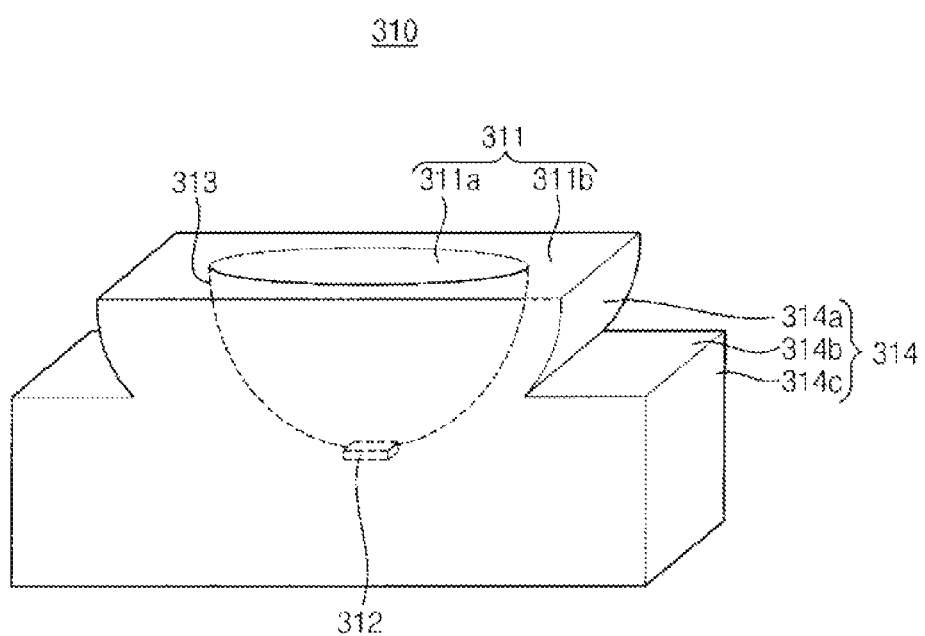

FIGS. 2A and 2B are perspective views illustrating a light-generating member of a display apparatus according to an exemplary embodiment of the present invention.

Referring to FIG. 2A, the light-generating member 310 includes a light source 312 and a body. For example, the light source 312 may be a LED. The body includes a light-exiting surface 311, a light-reflective surface 313 and a side surface 314. Light generated by the light source 312 exits from the light-generating member 310 through the light-exiting surface 311. The light-reflective surface 313 reflects the light. The side surface 314 extends from an edge of the light-exiting surface 311. The body has a substantially symmetrical shape with respect to the light source 312.

The light-exiting surface 311 faces the light-entering surface 331 of the light-guiding plate 330. The light-exiting surface 311 includes a first light-exiting surface 311a and a second light-exiting surface 311b surrounding the first light-exiting surface 311a. The first light-exiting surface 311a may have, for example, a round shape. Alternatively, the first light-exiting surface may have a polygonal shape such as a quadrangular shape.

A fluorescent material is coated on the light-reflective surface 313, and the light-reflective surface has a curved shape to reflect the light and to diffuse the light. For example, the light-reflective surface 313 may have a hemispherical shape substantially symmetrical with respect to the light source 312. Alternatively, the light-reflective surface 313 may have a plurality of flat surfaces. Furthermore, the fluorescent material may not be coated on the light-reflective surface 313 and the body may include a transparent material.

The body may have various shapes. A recess may be formed at the side surface 314 of the body. The recess is inserted into the combining recess 332 to secure the light-generating member 310 with the combining recess 332. For example, the recess is aligned with an entrance portion of the combining recess 332 to prevent the light-generating member 310 from moving.

The recess may include a plurality of surfaces. For example, the side surface 314 of the body may include a first side surface 314a, a second side surface 314b and a third side surface 314c. The first side surface 314a is a flat surface. An angle between the first side surface 314a and the light-exiting surface 311 is less than about 90 degrees. The second side surface 314b extends from an edge of the first side surface 314a. The third side surface 314c extends from an edge of the second side surface 314b. The width of the light-exiting surface 311 is greater than the width of the cross-section of the body. The cross-section of the body extends from a boundary between the first side surface 314a and the second side surface 314b and is substantially parallel with the light-exiting surface 311. Alternatively, the side surface 314 may have a single continuous surface. Furthermore, a whole portion of the light-generating member 310 may be received in the combining recess 332 of the light-guiding plate 330. Alternatively, a portion of the light-generating member 310, which includes the recess, may be received in the combining recess 332 of the light-guiding plate 330.

Referring to FIG. 2B, a light-generating member 310 is substantially the same as the light-generating member illustrated in FIG. 2A except that a first side surface 314a has a curved surface having a predetermined curvature. A gradient of a tangent line of the first side surface 314a may increase or decrease. For example, the first side surface 314a has a curvature substantially the same as the curvature of the light-reflective surface 313.

FIGS. 3A, 3B, 3C and 3D are perspective views illustrating a light-generating member of a display apparatus according to exemplary embodiment of the present invention.

Referring to FIGS. 3A to 3D, a light-generating member 410 includes a light source 412 and a body receiving the light source 412. The body is substantially symmetrical with respect to the light source 412. The body includes a light-exiting surface 411 and a light-reflective surface 413, which are substantially the same as the light-exiting surface and the light-reflective surface illustrated in FIGS. 2A and 2B. Thus, any further description will be omitted.

Figure 3A:
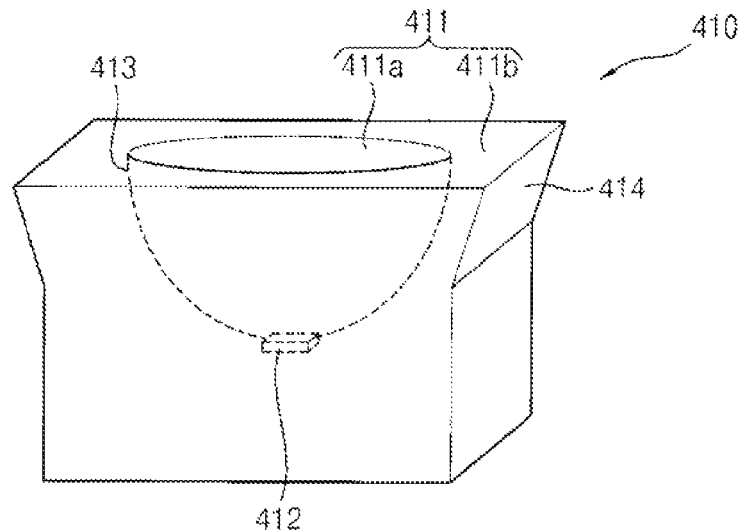
FIGS. 3A to 3D are perspective views illustrating a light-generating member of a backlight assembly according to an exemplary embodiment of the present invention.
Figure 3B:
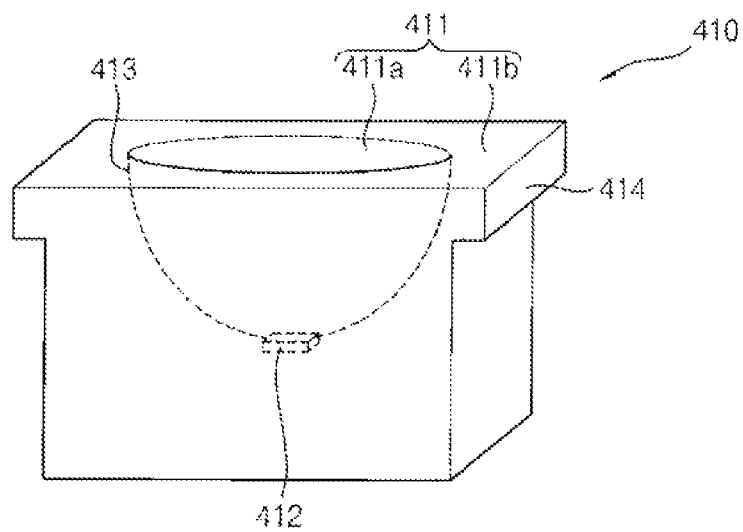
Figure 3C:
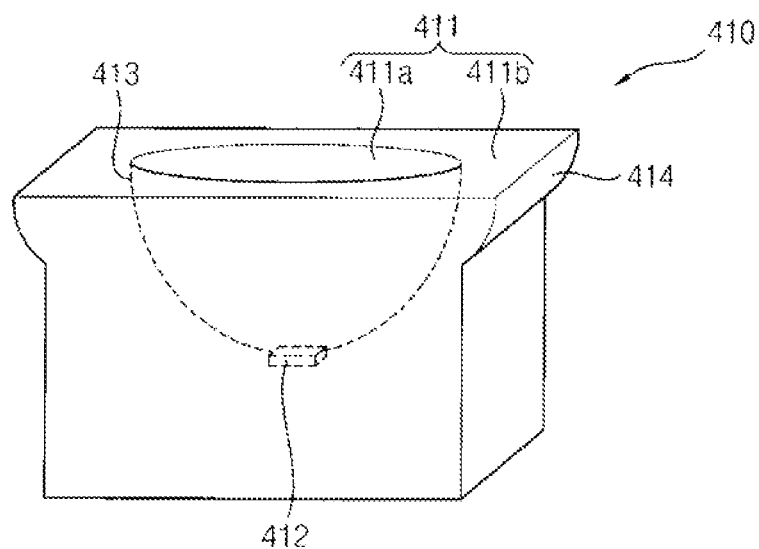
Figure 3D:
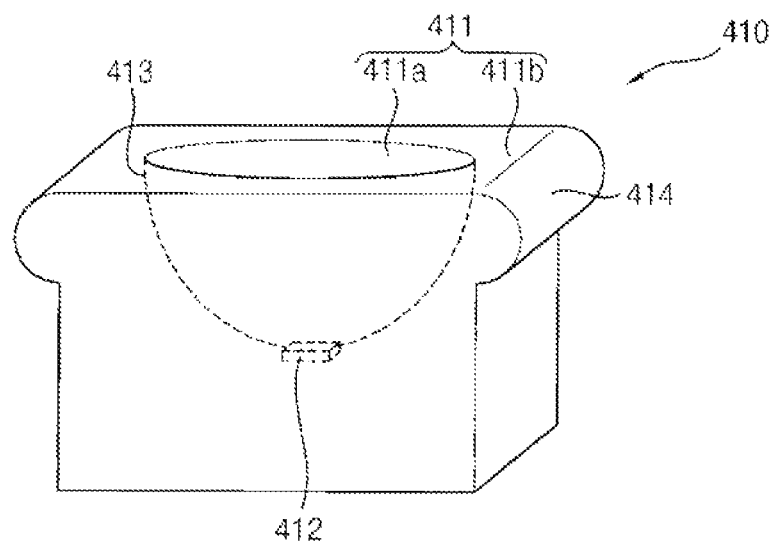

The body further includes a protrusion 414. The protrusion may have a various shapes. Referring to FIG. 3B, the protrusion 414 may have a first side surface extending from the light-exiting surface 411, a second side surface extending from a side surface of the body and a third surface connected to the first side surface and the second side surface.

The protrusion 414 is combined with the combining recess 332 of the light-guiding plate 330 to secure the light-generating member 410. Thus, the light-generating member 410 is prevented from moving. The protrusion 414 may be formed at the side surface of the body and spaced apart from the light-exiting surface 411. For example, the protrusion 414 may be formed at a central portion of the side surface.

A whole portion of the light-generating member 310 may be received in the combining recess 332 of the light-guiding plate 330. Alternatively, a portion of the light-generating member 310, which includes the protrusion 414, may be received in the combining recess 332 of the light-guiding plate 330.

Figure 4A:
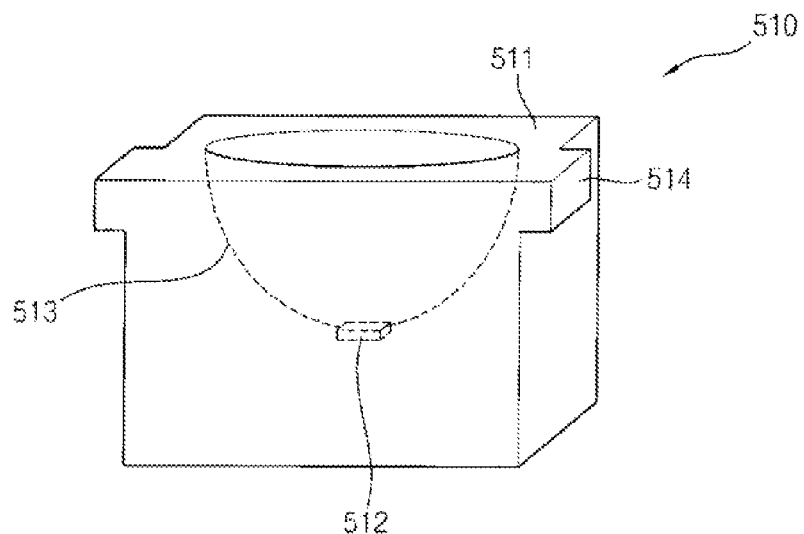
FIGS. 4A to 4C are perspective views illustrating a light-generating member of a backlight assembly according to an exemplary embodiment of the present invention.
Figure 4B:
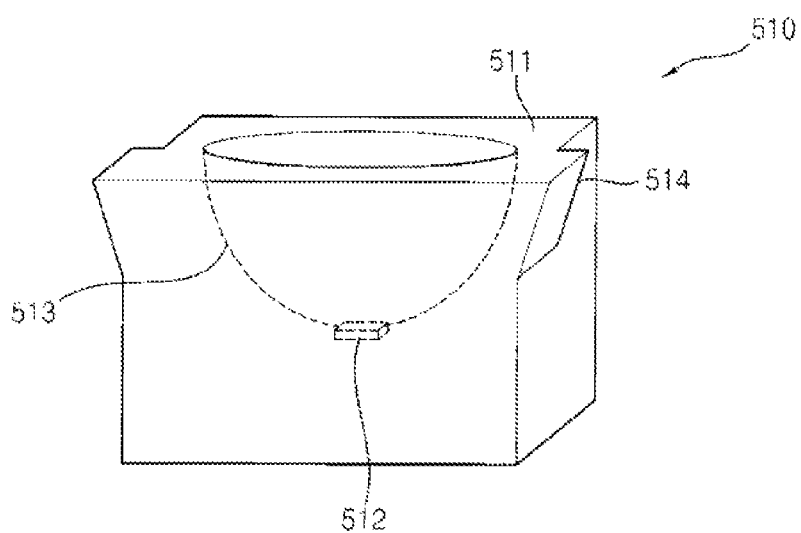
Figure 4C:
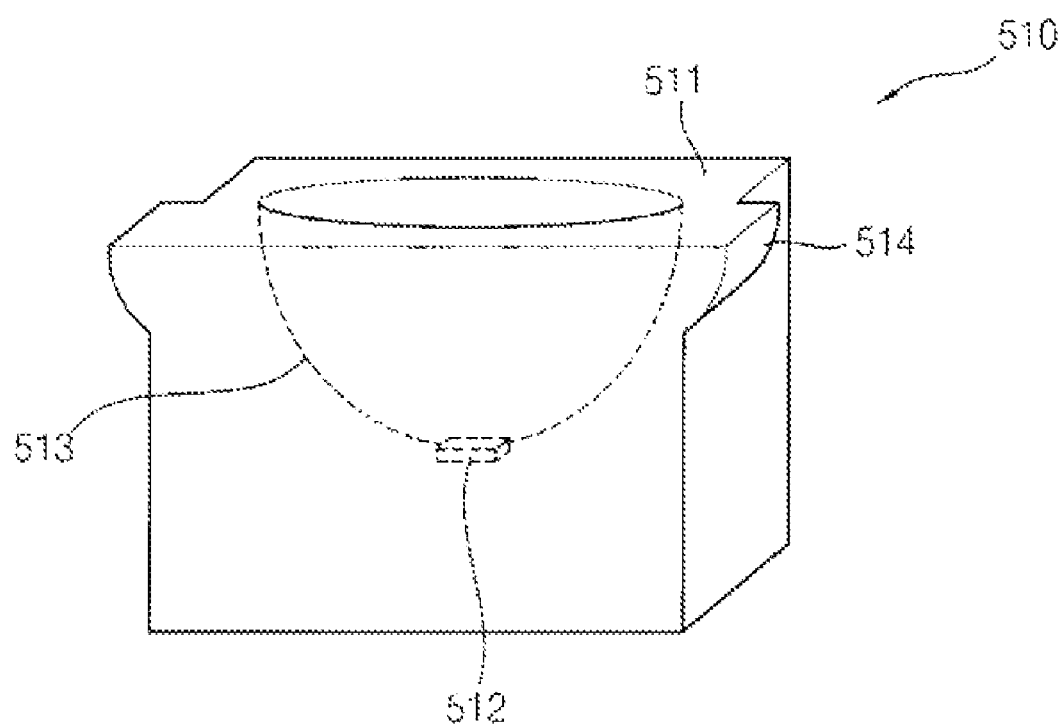

FIGS. 4A, 4B and 4C are perspective views illustrating a light-generating member of a display apparatus according to an exemplary embodiment of the present invention.

Referring to FIGS. 4A to 4C, a light-generating member 510 includes a light source 512 and a body receiving the light source 512. The body includes a protrusion 514, a light-exiting surface 511 and a light-reflective surface 513, which are substantially the same as the protrusion illustrated in FIGS. 3A to 3D except that the protrusion 514 is formed at a portion of a side surface of the body. For example, the width of the protrusion 514 is smaller than the width of the side surface of the body. The protrusion 514 may extend from the light-exciting surface 511. Alternatively, the protrusion 514 may be formed at a portion of the side surface of the body and spaced apart from the light-exiting surface 511.

Figure 5:
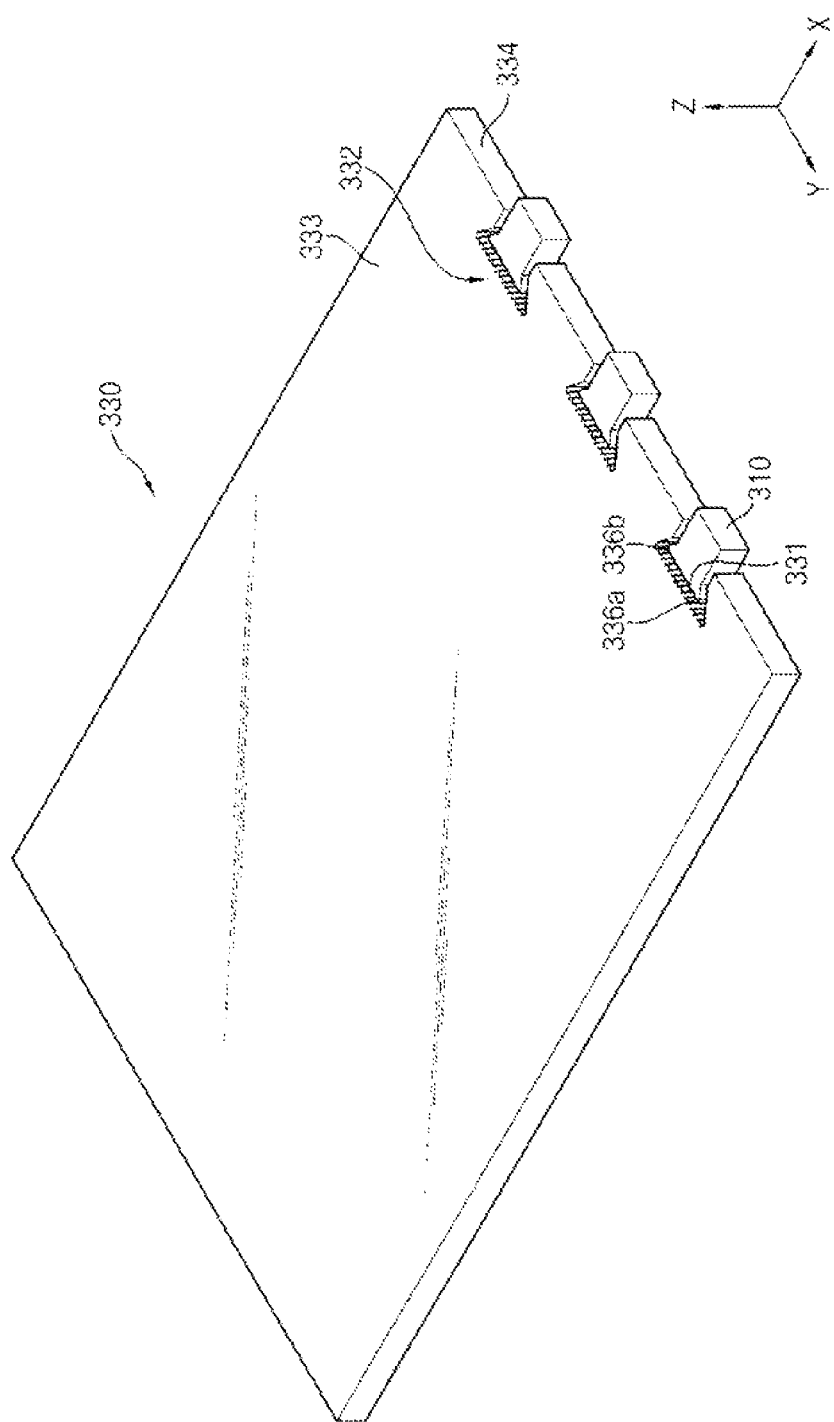
FIGS. 5 and 6 are perspective views illustrating a light-guiding plate and a light-generating member of a backlight assembly according to an exemplary embodiment of the present invention.
Figure 6:
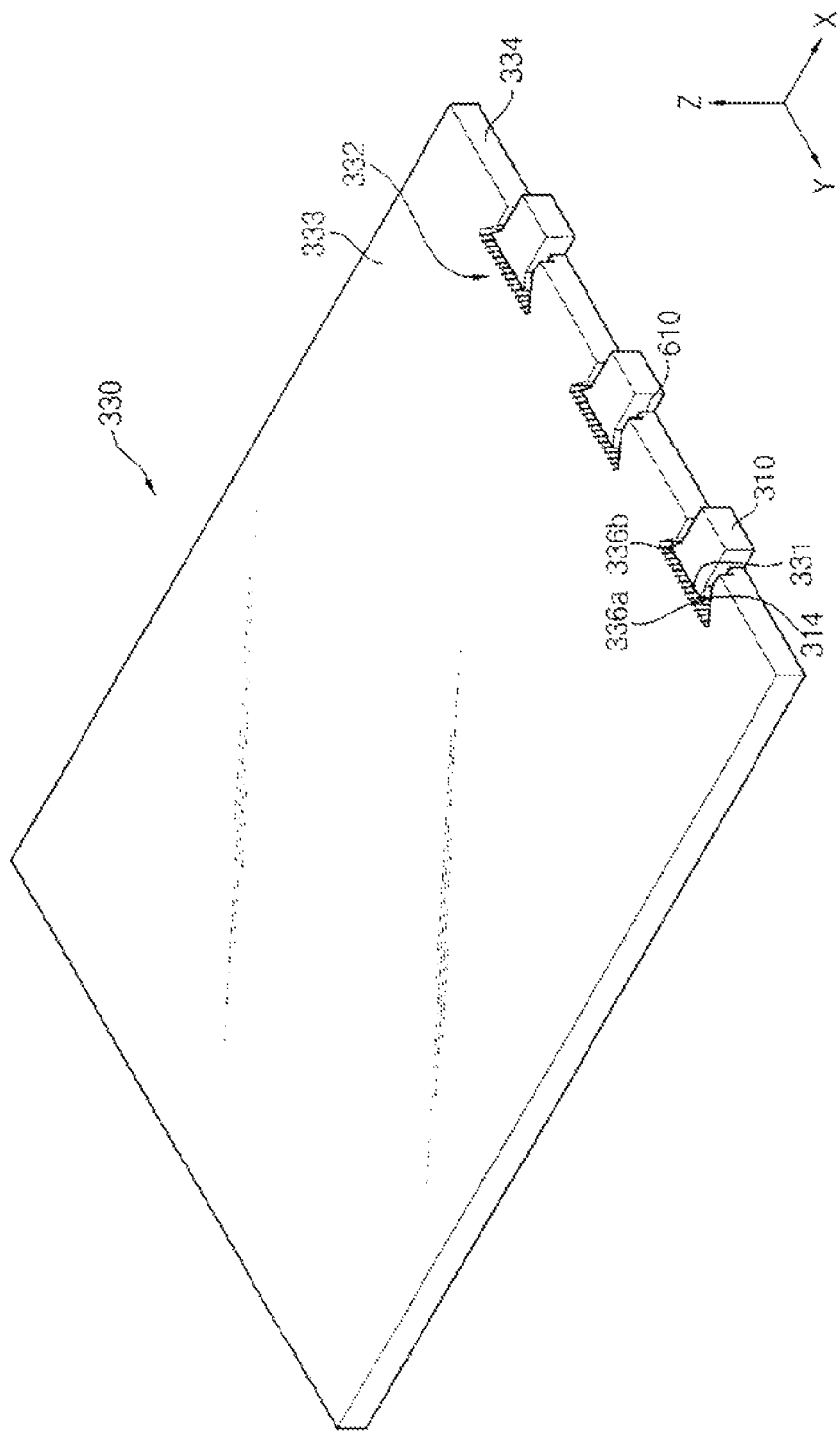

FIGS. 5 and 6 are perspective views illustrating a light-guiding plate and a light-generating member of a backlight assembly according to an exemplary embodiment of the present invention.

Referring to FIG. 5, a combining recess 332, into which a light-generating member 310 is inserted, is formed at a side surface 334 of a light-guiding plate 330. The combining recess 332 has a light-entering surface 331, a first side surface 336a and a second side surface 336b. Light generated by the light-generating member 310 enters the light-guiding plate 330 through the light-entering surface 331. The first and second side surfaces 336a and 336b are respectively connected to both ends of the light-entering surface 331, which are opposite to each other. For example, a first width of the combining recess 332 adjacent to the side surface 334 of the light-guiding plate 330 is smaller than a second width of the combining recess 332 adjacent to the light-entering surface 331. For example, an angle between the first side surface 336a and the light-entering surface 331 and an angle between the second side surface 336b and the light-entering surface 331 may be less than about 90 degrees.

A light-diffusing pattern may be formed at the light-entering surface 331 to diffuse the light entering the light-guiding plate 330. For example, the light-diffusing pattern may be a protrusion. Particularly, the light-diffusing pattern may be a prism arranged in a direction 'Y' or in a direction 'Z'. The combining recess 332 is opened upward. Thus, the light-generating member 310 may be inserted into the combining recess 332 in the direction 'Z' substantially perpendicular to an upper surface 333 of the light-guiding plate 330. The light-generating member 310 may be of the light-generating members illustrated in FIGS. 3A to 3D and FIGS. 4A to 4C. A shape of the combining recess 332 is substantially the same as a shape of the light-generating member 310. A portion of the light-generating member 310 is inserted into the combining recess 332 to secure the light-generating member 310. Thus, the distance between the light-entering surface 331 and the light-exiting surface of the light-generating member 310 is not substantially varied. For example, each of the first and second side surfaces 336a and 336b may have a shape substantially the same as a side surface of the light-generating member 310.

Referring to FIG. 6, a combining recess 332 into which a light-generating member 310 is inserted, is formed at a first side surface 334 of a light-guiding plate 330. The combining recess 332, the light-generating member 310 and the light-guiding plate 330 are substantially the same as the combining recess, the light-generating member and the light-guiding plate illustrated in FIG. 5 except that a protrusion 314 of the light-generating member 310 is aligned with a supporting portion 610 of the light-guiding plate 330. The protrusion 314 is formed at a portion of a side surface of the light-generating member 310 as illustrated in FIGS. 4A to 4C. A supporting portion 610 is formed under the combining recess 332. For example, the supporting portion 610 is disposed under the protrusion 314 of the light-generating member 310 to prevent the light-generating member 310 from moving beneath the light-guiding plate 330. The supporting portion 610 may be connected to the first and second side surfaces 336a and 336b. The supporting portion 610 may have substantially the same shape as the protrusion 314 The supporting portion 610 is disposed under the protrusion 314 of the light-generating member 310 to support the light-generating member 310. The supporting portion 610 may have an opening.

Referring to FIGS. 1, 5 and 6, the length of the backlight assembly having the light-guiding plate 330 and the light-generating member 310 may be reduced by the length of a portion of the light-generating member 310, which is inserted into the combining recess 332. A recess 391 may be formed at the mold frame 390 to receive a portion of the light-generating member 310, which is not inserted into the combining recess 332.

Figure 7:
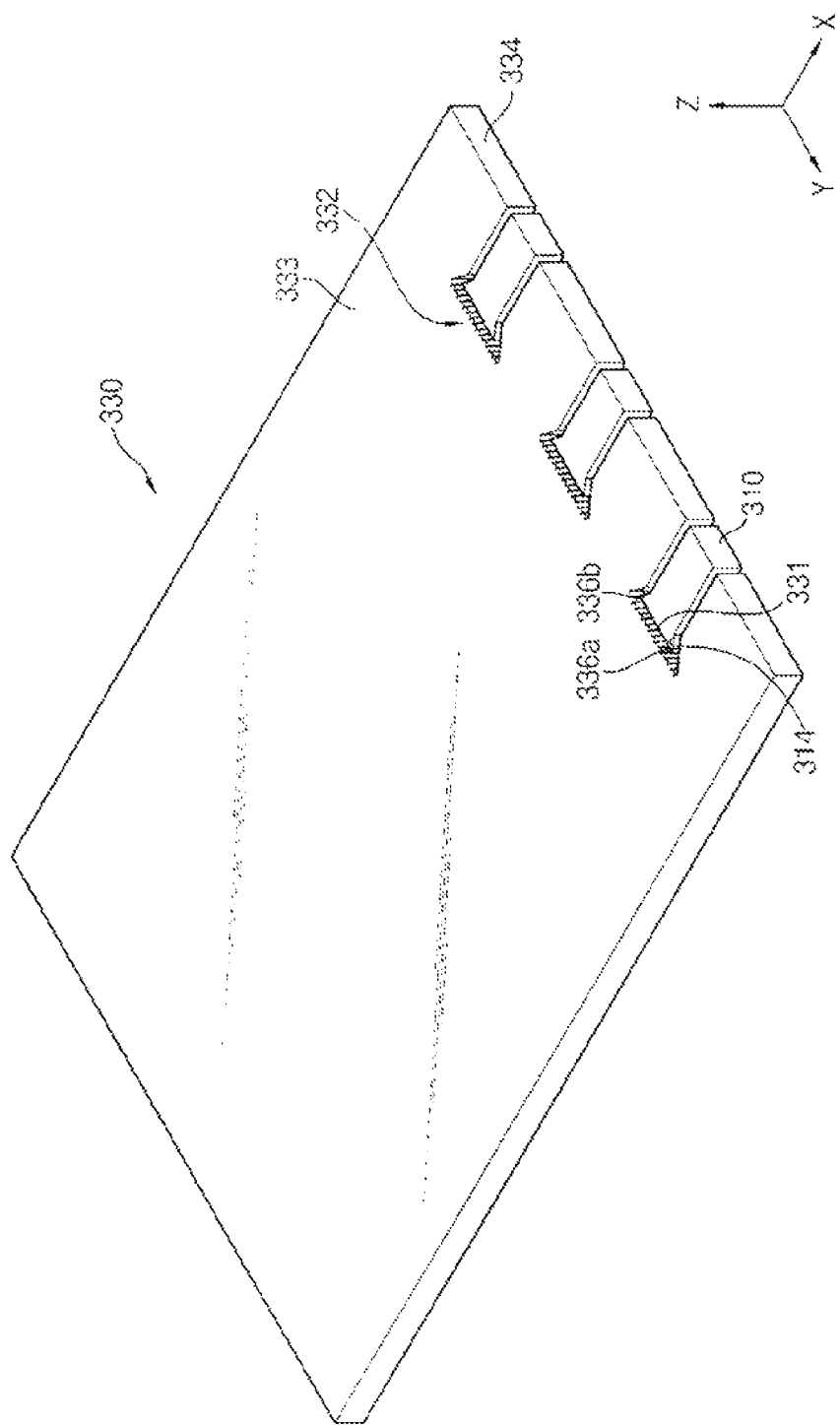
FIG. 7 is a perspective view illustrating a light-guiding plate and a light-generating member of a backlight assembly according to an exemplary embodiment of the present invention.

FIG. 7 is a perspective view illustrating a light-guiding plate and a light-generating member of a backlight assembly according to an exemplary embodiment of the present invention.

Referring to FIG. 7, a combining recess 332, into which a light-generating member 310 is inserted, is formed at a first side surface 334 of a light-guiding plate 330. The combining recess 332, the light-generating member 310 and the light-guiding plate 330 are substantially the same as the combining recess, the light-generating member and the light-guiding plate illustrated in FIG. 5 except that a whole portion of the light-generating member 310 is received in the light-guiding plate 330. Thus, any further description will be omitted.

For example, a whole portion of the light-generating member 310 is inserted into the combining recess 332 of the light-guiding plate 330. A protrusion 314 is formed at a side surface of the light-generating member 310. The protrusion 314 may have various shapes. Each of a first side surface 336a and a second side surface 336b of the combining recess 332 has substantially the same shape as a side surface of the light-generating member 310. A supporting portion may be disposed under the combining recess 332. The supporting portion extends from the first and second side surfaces 336a and 336b. The supporting portion is disposed under the protrusion 314 of the light-generating member 310 to prevent the light-generating member 310 from moving beneath the light-guiding plate 330.

Figure 8:
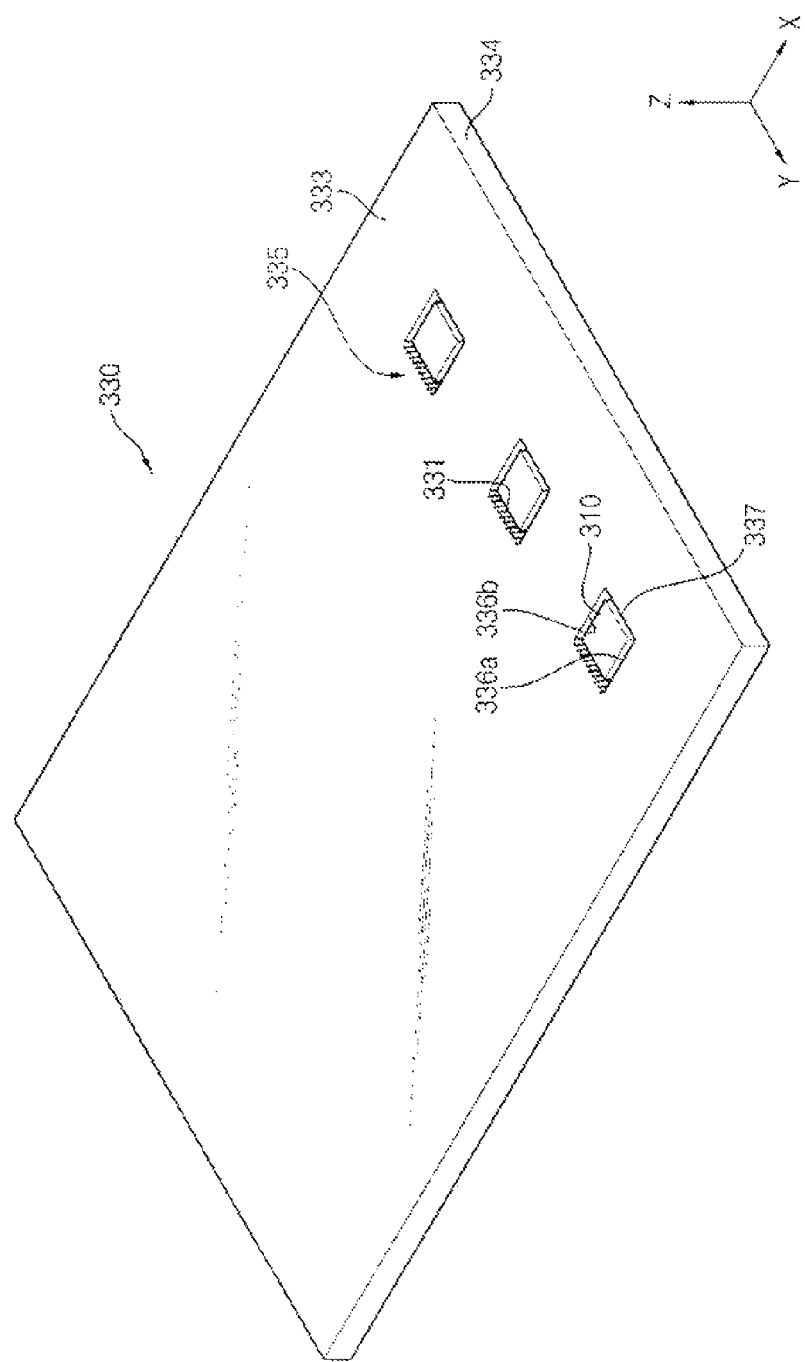
FIG. 8 is a perspective view illustrating a light-guiding plate and a light-generating member of a backlight assembly according to an exemplary embodiment of the present invention.

FIG. 8 is a perspective view illustrating a light-guiding plate and a light-generating member of a backlight assembly according to an exemplary embodiment of the present invention.

Referring to FIG. 8, a light-guiding plate 330 has a combining recess 335, into which a light-generating member 310 is inserted. The combining recess 335 is opened upward so that the light-generating member 310 is inserted into the combining recess 335 in a direction 'Z' substantially perpendicular to an upper surface 333 of the light-guiding plate 330. The combining recess 335 has a supporting portion to support the light-generating member 310. The supporting portion is disposed under the combining recess 335.

The light-generating member 310 includes a body and a light source. The combining recess 335 has a light-entering surface 331, a counter surface 337, a first side surface 336a and a second side surface 336b. A light-diffusing pattern is formed at the light-entering surface 331. The body may include a transparent material. When the body includes the transparent material, the light-diffusing pattern may be further formed at the first and second side surfaces 336a and 336b. Furthermore, the diffusing pattern and a light-reflective pattern, may be formed, for example, at the counter surface 337. Also, a light-reflective material may be coated at the counter surface 337.

The light-generating member 310 is inserted into the combining recess 335 in the direction 'Z'. The thickness of the light-generating member 310 is smaller than the thickness of the light-guiding plate 330. Thus, when the light-generating member 310 is in received in the combining recess 330, the light-generating member 310 does not protrude from the light-guiding plate 330. For example, when the light-generating member 310 is received in the combining recess 330, the height of the light-generating member 310 may be substantially the same as the height of the light-guiding plate 330. The light-generating member 310 inserted in the combining recess 330 is prevented from moving.

A contact hole may be formed at a side surface 334 of the light-guiding plate 330 to electrically connect the light-generating member 310 to a printed circuit board. The light-generating member 310 is electrically connected to the printed circuit board through the contact hole. Alternatively, the light-generating member 310 may be electrically connected to the printed circuit board through a flexible printed circuit board disposed on the light-generating member 310 and the light-guiding plate 330.

Figure 9:
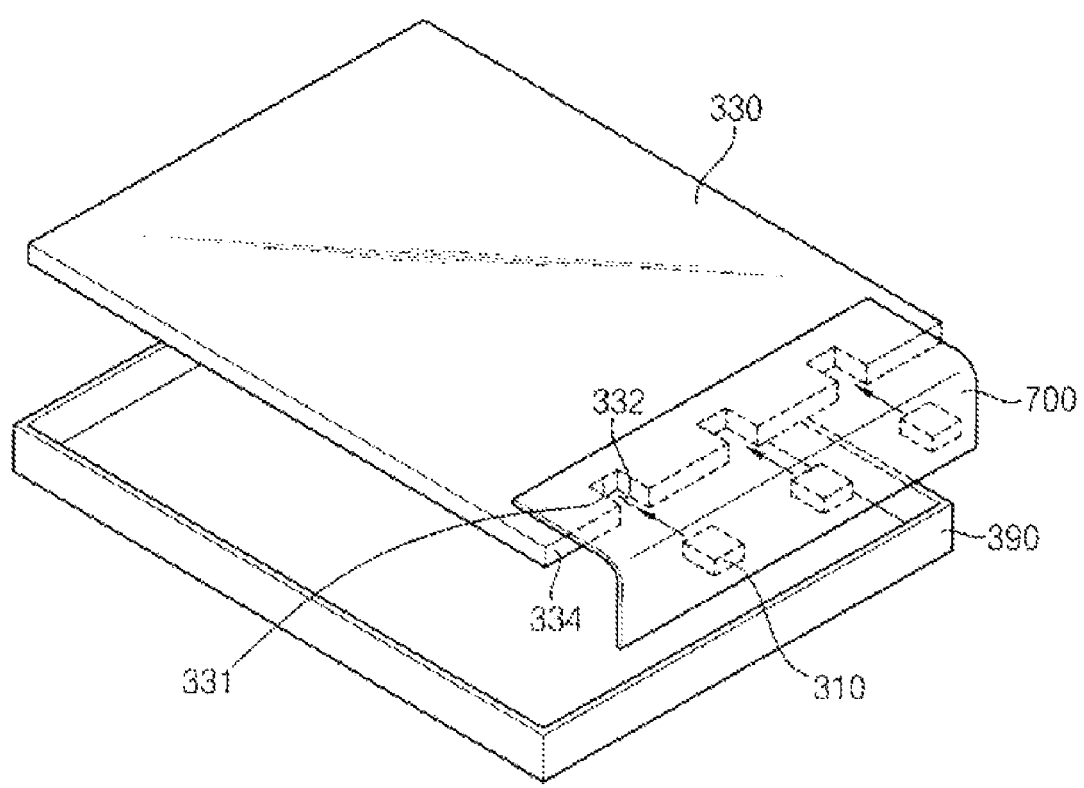
FIG. 9 is a perspective view illustrating a backlight assembly according to an exemplary embodiment of the present invention.

FIG. 9 is a perspective view illustrating a backlight assembly according to an exemplary embodiment of the present invention.

Referring to FIG. 9, a backlight assembly includes a light-guiding plate 330, a flexible printed circuit board 700, a light-generating member 310 and a receiving container 390. The light-guiding plate 330 has a combining recess 332 to receive the light-guiding member 310.

The light-generating member 310 generates light to provide the light-guiding plate 330 with the light through a light-entering surface 331 formed at a side surface 334 of the light-guiding plate 330. The light-generating member 310 may be disposed adjacent to a side surface of the light-guiding plate 330 or adjacent to both of side surfaces opposite to each other. For example, the light-generating member 310 may include a light emitting diode.

The flexible printed circuit board 700 is disposed on the light-guiding plate 330. Alternatively, the flexible printed circuit board 700 may be under the light-guiding plate 330. A reflective material is coated at a portion of the flexible printed circuit board 700, which is adjacent to the light-generating member 310, to reflect light exiting from the light-generating member 310. Examples of the reflective material may include a white ink having a relatively great reflectivity. A circuit pattern is formed at the flexible printed circuit board 700 to generate electrical signals to operate a liquid crystal display apparatus and to provide the liquid crystal display apparatus with the electrical signals. A driving chip may be mounted on the flexible printed circuit board 700. The driving chip may be directly mounted on a liquid crystal display panel of the liquid crystal display apparatus.

When the flexible printed circuit board 700 is disposed on the light-guiding plate 330 and the light-generating member 310, the flexible printed circuit board 700 bends to cover the light-generating member 310 and is received in the receiving container 390. The flexible printed circuit board 700 prevents the light-generating member from moving.

According to exemplary embodiments of the present invention, a light-generating member is inserted into a combining recess formed at a light-guiding plate to prevent the light-generating member from moving and to maintain a uniform distance between the light-generating member and the light-guiding plate. Thus, light generated by the light-generating member may uniformly enter the light-guiding plate.

Thus, the variation in brightness may be reduced, and a display quality of the liquid crystal display may be improved.

Having described the exemplary embodiments of the present invention, it is further noted that it is readily apparent to those of reasonable skill in the art that various modifications may be made without departing from the spirit and scope of the invention which is defined by the metes and bounds of the appended claims.

What is claimed is:

1. A backlight assembly comprising:
   a light-guiding plate having a lower surface, an upper surface and a side surface at which a combining recess is formed, wherein the combining recess has a first side surface, a second side surface facing the first side surface and a light-entering surface connected to the first and second side surfaces, wherein the light-entering surface is substantially parallel with the side surface, wherein a first width of the combining recess adjacent to the side surface of the light-guiding plate is smaller than a second width of the combining recess adjacent to the light-entering surface; and
   a light-generating member having a light source and a body, and wherein at least a portion of the body of the light-generating member is for being inserted into the combining recess.

2. The backlight assembly of claim 1, wherein the second width of the combining recess increases, as a distance from each of the first and second side surface to the light-entering surface decreases.

3. The backlight assembly of claim 2, wherein each of the first and second side surfaces has a single surface.

4. The backlight assembly of claim 2, wherein each of the first and second side surfaces has a flat surface.

5. The backlight assembly of claim 1, wherein each of the first and second side surfaces has a curved surface.

6. The backlight assembly of claim 5, wherein a gradient of a tangent line of each of the first and second side surfaces increases, as a distance between the light-entering surface and each of the first and second side surfaces decreases.

7. The backlight assembly of claim 5, wherein a gradient of a tangent line of each of the first and second side surfaces decreases, as a distance between the light-entering surface and each of the first and second side surfaces decreases.

8. The backlight assembly of claim 1, wherein a portion of the body of the light-generating member is partially inserted into the combining recess.

9. The backlight assembly of claim 8, wherein a shape of the body inserted into the combining recess is substantially the same as a shape of the combining recess.

10. The backlight assembly of claim 9, wherein a width of the body adjacent to the light-entering surface is greater than the first width of the combining recess adjacent to the side surface of the light-guiding plate.

11. The backlight assembly of claim 10, wherein the combining recess is opened upward.

12. The backlight assembly of claim 11, wherein the light-guiding plate further has a supporting portion disposed under the combining recess to support the light-generating member.

13. The backlight assembly of claim 12, wherein the supporting portion has an opening.

14. The backlight assembly of claim 1, wherein the combining recess is opened upward.

15. The backlight assembly of claim 14, wherein the light-guiding plate further has a supporting portion disposed under the combining recess to support the light-generating member.

16. The backlight assembly of claim 1, wherein a diffusing pattern is formed at the light-entering surface.

17. The backlight assembly of claim 1, wherein the light source is a light emitting diode.

18. The backlight assembly of claim 17, further comprising a flexible printed circuit board covering the light emitting diode.

19. The backlight assembly of claim 1, wherein a recess is formed at a side surface of the body.

20. The backlight assembly of claim 19, wherein a protrusion is formed at each of the first and second side surfaces and aligned with the recess of the body.

21. The backlight assembly of claim 20, wherein a cross-section of the recess, which is substantially perpendicular to a depth direction of the recess, decreases, as a depth of the recess increases.

22. The backlight assembly of claim 1, wherein the body has a protrusion formed at a side surface of the body.

23. The backlight assembly of claim 22, wherein a groove is formed at each of the first and side surfaces and aligned with the protrusion of the body.

24. The backlight assembly of claim 23, wherein a cross-section of the protrusion, which is substantially perpendicular to a height direction of the protrusion, decreases, as a height of the protrusion increases.

25. The backlight assembly of claim 1, wherein a first side portion of the light-guiding plate, which faces the light-generating member, is thicker than a second side portion of the light-guiding plate, which is in opposite of the first side.

26. A backlight assembly comprising:
a light-guiding plate having a lower surface and an upper surface, a side surface and a combining recess, wherein the combining recess is spaced apart from the side surface of the light guiding plate and is closed in all side directions so that all sides of the combining recess are formed apart from the side surface of the light guiding plate, wherein a light-entering surface of the combining recess is substantially parallel with the side surface of the light-guiding plate; and
a light-generating member, having a light source and a body, wherein at least a portion of the body of the light generating member is for being inserted into the combining recess,
wherein the combining recess has a supporting portion formed under the combining recess to support the light-generating member.

27. The backlight assembly of claim 26, wherein the light-guiding plate further has an opening that passes through a lower surface of the combining recess and the lower surface of the light-guiding plate.

28. The backlight assembly of claim 27, wherein a shape of the light-generating member is substantially the same as a shape of the combining recess.

29. The backlight assembly of claim 27, wherein a diffusing pattern is formed at the light-entering surface.

30. A liquid crystal display apparatus comprising:
a backlight assembly comprising:
a light-guiding plate having a lower surface, an upper surface and a side surface at which a combining recess is formed, wherein the combining recess has a first side surface, a second side surface facing the first side surface and a light-entering surface connected to the first and second side surfaces, wherein the light-entering surface is substantially parallel with the side surface, wherein a first width of the combining recess adjacent to the side surface of the light-guiding plate is smaller than a second width of the combining recess adjacent to the light-entering surface; and
a light-generating member having a light source and a body, wherein at least a portion of the body of the light-generating member being inserted into the combining recess;
at least one optical sheet disposed on the backlight assembly; and
a liquid crystal display panel.

31. The liquid crystal display apparatus of claim 30, wherein a width of the body adjacent to the light-entering surface is greater than the first width of the combining recess.

32. The liquid crystal display apparatus of claim 31, wherein the combining recess is opened upward.

33. The liquid crystal display apparatus of claim 32, wherein a shape of the body inserted into the combining recess is substantially the same as a shape of the combining recess.

* * * * *